(No Model.)
I. L. CARMAN.
TIRE TIGHTENER.
No. 517,813. Patented Apr. 3, 1894.
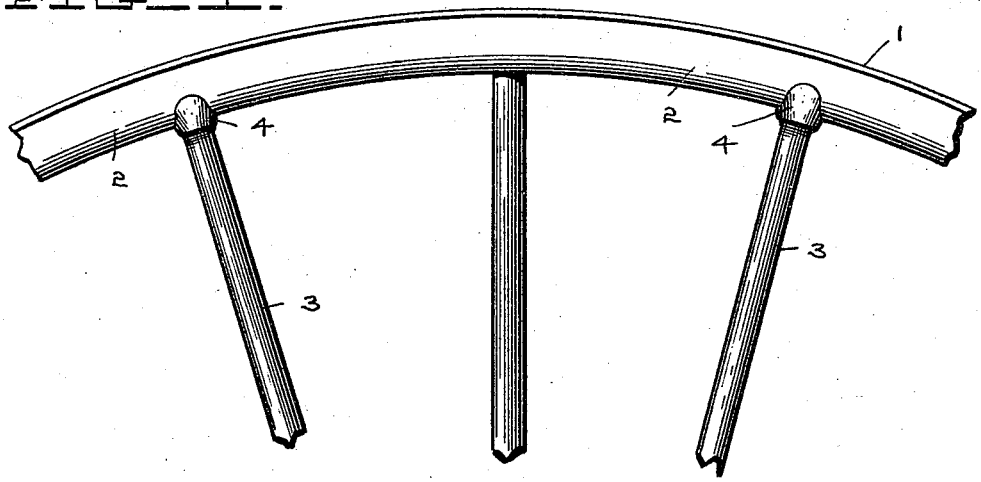
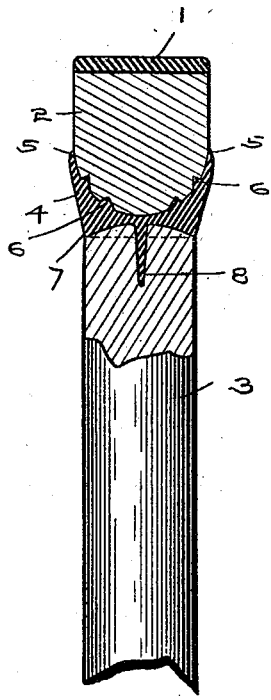
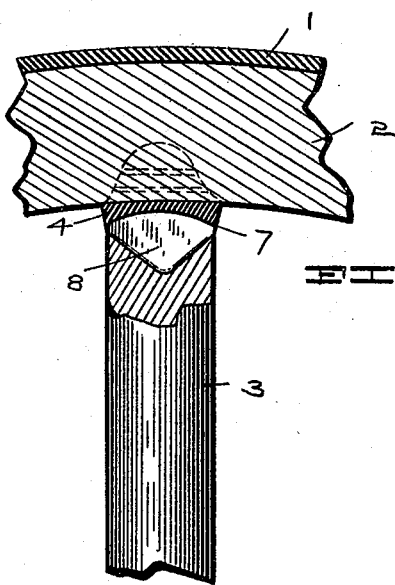
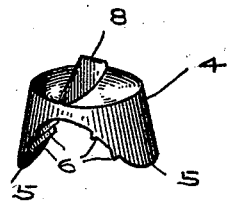
Witnesses
H. F. Nealy.
A. W. Tilford.
Inventor
Isaac L. Carman.
By Attorney
V. H. Lockwood.

UNITED STATES PATENT OFFICE.

ISAAC L. CARMAN, OF NORTH SALEM, ASSIGNOR OF ONE-HALF TO JOSHUA H. McGEE, OF MAX, INDIANA.

TIRE-TIGHTENER.

SPECIFICATION forming part of Letters Patent No. 517,813, dated April 3, 1894.

Application filed May 25, 1893. Serial No. 475,524. (No model.)

*To all whom it may concern:*

Be it known that I, ISAAC L. CARMAN, of North Salem, county of Hendricks, and State of Indiana, have invented certain new and useful Improvements in Tire-Tighteners; and I do hereby declare that the following is a full, clear, and exact description thereof, reference being had to the accompanying drawings, in which like figures refer to like parts.

My invention relates to a tire tightener, and my chief object is to make a tightener which will be small and therefore easy to carry, cheap, and readily inserted by any one at any time or place. The chief disadvantage of tighteners heretofore used has been due to the difficulty of placing them. Only a blacksmith or persons provided with tools and experience, could properly place them. Furthermore they were expensive and more or less bulky.

The essential feature of my invention consists in utilizing preferably only one piece of metal and that a small one. This piece of metal is concave on the upper side to fit against the under side of the felly, and the under side of the tightener is made concave, or is hollowed out, so that when the tightener is slipped in between the end of a spoke and the felly, the end of the spoke will fit in the concavity on the under side of the tightener and be held there by the surrounding rim of the tightener.

Another feature of my invention consists in providing, preferably integral with the tightener, a tongue extending centrally from the under side for the purpose of fitting like a wedge into the end of the spoke, thereby holding the end of the spoke in place, and especially preventing any lateral movement. These features will appear more fully from the following description and by reference to the drawings, which are a part hereof.

Figure 1 is a side elevation of a section of a wheel, the tire, felly and spokes being partly cut away. Fig. 2 is a cross section of the tire, felly, tightener and the outer end of the spoke where the spoke joins the felly, showing my tightener in place. Fig. 3 is a longitudinal section of the same that is shown in Fig. 2, just at one side of the tongue; and Fig. 4 is a side elevation in perspective of my tightener inverted, showing especially the bottom of it.

1 is a tire of a wheel and 2 is the felly. 3 are spokes, which when the wheel was originally made were tenoned into the felly in the usual manner, the central spoke retains its original connection with the felly, but the two outer spokes are connected with the felly by my tightener clip 4. My tightener clip 4 is concave on its upper side in cross section, or otherwise constructed to fit and hug snugly the under side of the felly 2, as shown in Fig. 2. It therefore has flanges 5 extending up on each side of the felly a short distance. To enable it to cling more tightly to the felly the upper side is provided with corrugations or teeth 6. This will prevent lateral movement of the tightener on the felly. The under side of the tightener, as shown in Fig. 2, is made concave or dished out so that the end of the spoke will fit in such concavity, and the spoke will be held in place by means of the surrounding rim 7. With many this is a desirable form of my tightener. I also, when desired, provide a tongue 8, preferably triangular in form and rather sharp at its edges, which extend down from the under side of the tightener clip, preferably from the central portion thereof and in such manner that the tongue will extend in the same direction horizontally as the felly 2. The end view of this tongue is shown inserted in the spoke, in Fig. 2, and the side view of the same in Fig. 3. The tongue itself may be seen in Fig. 4. The purpose of this tongue is to enable the clip to hold the spoke in place and vice versa. When the tongue 8 is used the under surface of the clip need not be concave, although that is preferable, but may be flat as the tongue 8 will hold the spoke and clip together. The tongue must not be so thick at its upper end as to split the wood.

It will be seen that this is a very small and simple device, and that is one of its best merits. It can be easily carried in the vehicle and put in place when ever occasion requires it, in a very few minutes of time, by anybody. In order to place it the spoke should be separated from the felly at the joint, by a knife or saw. Some ordinary means is then used to pry the felly upward and away from the end of the spoke. This may be done by a special device provided for such work, or by placing a short board on the hub of the wheel as a fulcrum, and using a stake or a rail as a lever to catch under the felly and pry it somewhat upward. While the felly is thus sprung away from the end of the spoke, my tightener is slipped in between the two and the task is done. If the tongue 8 is on the clip it may be driven in place by a few blows from a hammer. As many spokes may be thus treated, as will be necessary to tighten the tire, usually but very few being required. It may be preferable to treat every other spoke in this manner, unless the tire is so loose as to require a clip on almost every spoke.

Because my tightener is so simple and small it may seem to be inefficient and unable to maintain the joint between the spoke and felly. This, however, is not true as it makes as strong a wheel as can be made, when it is used on every spoke in the wheel, judging from my past experience. The corrugations on the upper side of the clip prevent the clip from turning on the felly and the concavity on the under side of the clip prevents the spoke from moving laterally under the clip and when the tongue 8 is used the hold of the tightener is all the greater. The wheel with these clips in place is far stronger and more durable than when the tire is cut and shortened in the old fashioned way, for in such case the workman draws the tire on so tightly that he mashes the end of the spoke into the felly, or otherwise injures the connection or joint between the two, and thus weakens the wheel.

The form of my clip on the upper side tends to clasp and bind together the felly when it may have been split or spread by any means. This tightener may be painted before hand in the same color as the carriage, or painted afterward, but in either case the clip is practically unnoticeable, thus not injuring the appearance of the wheel as many tire tighteners do.

What I claim as my invention, and desire to secure by Letters Patent, is—

1. A tire tightener comprising a clip formed on the upper side to fit the felly, corrugations on the upper side, and dished on the under side, substantially as shown and described.

2. A tire tightener comprising a clip formed on the upper side to fit the felly, and a wedge shaped tongue extending centrally from the under side and adapted to hold the end of the spoke in place and adapted to be parallel with the felly when in place, substantially as shown and described.

3. A tire tightener comprising a clip formed on the upper side to fit the felly and dished on the under side and provided with a tongue centrally extending from the under side, substantially as shown and described.

4. A tire tightener consisting of a clip concave in cross section on the upper side, corrugations on the upper side, and means on the under side for holding the tightener to the spoke, substantially as shown and described.

In witness whereof I have hereunto set my hand this 18th day of May, 1893.

ISAAC L. CARMAN.

Witnesses:
JOHN D. ADAIR,
STEPHEN D. GRIMES.